April 28, 1931. F. R. RYBERG 1,802,837
CLEANING MECHANISM
Filed Jan. 16, 1924 2 Sheets-Sheet 2

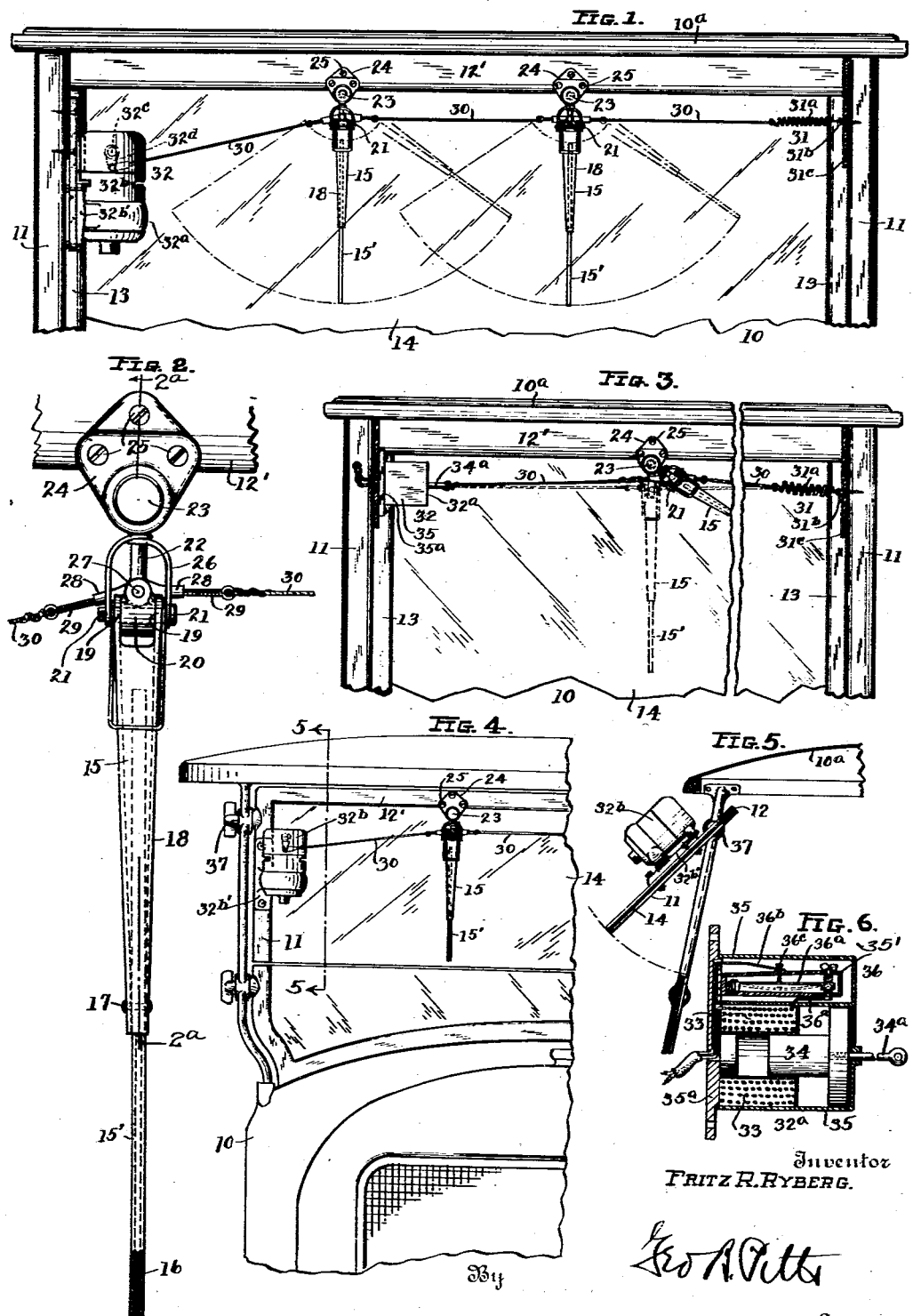

Inventor
Fritz R. Ryberg
By Geo. A. Pitts
attorney

Patented Apr. 28, 1931                                                                                           1,802,837

UNITED STATES PATENT OFFICE

FRITZ R. RYBERG, OF CLEVELAND, OHIO

CLEANING MECHANISM

Application filed January 16, 1924. Serial No. 686,522.

The present invention relates to a window cleaning mechanism, and more particularly to a cleaning mechanism for windows and windshields, for example, automobiles, street cars or other vehicles.

One object of the invention is to provide a window cleaning mechanism which may be located entirely outside of the vehicle, and in such manner as to sweep the surface of the window whether it be fixedly mounted, vertically slidable or swingably mounted upon pivots, trunnions or the like.

Another object is to provide a window cleaning mechanism with one or more squeegees which are urged normally to move in one direction, and which are operated by a motor or other suitable device to move at times in the other direction so as to move across the window and thus maintain the same clear of rain, snow or other elements.

A still further object of the invention is to construct a window cleaning mechanism in which the cleaning device is operated in opposite directions by separate devices.

Another object of the invention is to provide a cleaning mechanism having a swingable cleaning device and separate mechanisms for operating the device in opposite directions so constructed that one thereof may be controlled or actuated to effect the swinging of the cleaning device as often as desired.

Other objects of the invention will be apparent to those skilled in the art to which my invention relates from the following description taken in connection with the accompanying drawing, wherein Figure 1 is a front elevation of a window cleaning mechanism embodying my invention shown applied to the windshield of a motor vehicle, the latter being shown fragmentarily.

Figure 2 is a detail enlarged front elevation of a cleaning device and its mounting, the view being partly in section.

Figure 3 is a view similar to Figure 1, but showing a slight modification in the construction of one of the operating means.

Figure 4 is a fragmentary front elevation of the cleaning mechanism of Fig. 1 as applied to a motor vehicle having a pivoted or trunnioned windshield.

Figure 5 is a section substantially on the line 5—5 of Figure 4, and

Figure 6 is an enlarged longitudinal section taken through the modified form of operating device shown in Figure 3.

Figure 3A:
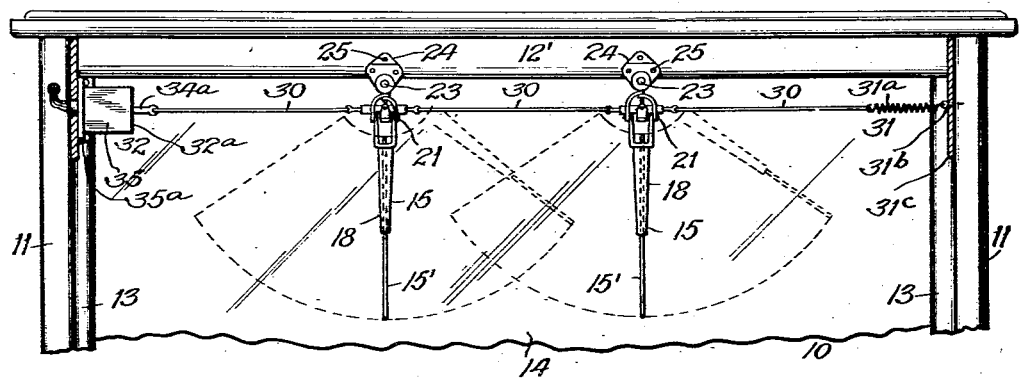
Fig. 3a is a view similar to Fig. 3, but showing a plurality of cleaning devices.
Figure 2A:
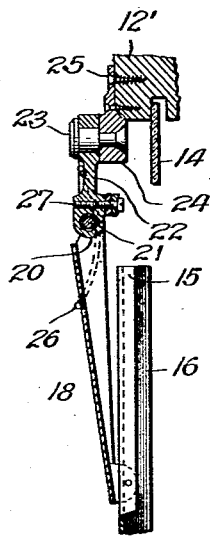
Fig. 2a is a fragmentary section on the line 2a—2a of Fig. 2.

Referring to the drawing, 10 designates a vehicle, a portion only of which is shown. In Figure 1, where an enclosed body type of vehicle body is shown for illustrative purposes, 10a indicates the top and 11 indicates uprights or corner posts. 12 indicates a windshield extending between the corner posts 11. The windshield preferably comprises a top member 12' and side members 13, forming a frame within which is mounted a transparent pane 14. The frame is preferably mounted to slide vertically in guides formed in the posts 11.

In the form of the invention shown in Figure 1 the cleaning mechanism comprises one or more cleaning devices 15. Each device 15 may comprise an over-turned or channel member 15' between the sides of which is clamped a strip of rubber 16, felt or the like to form a squeegee for contact with the pane of glass 14. The channel member 15' is pivotally mounted intermediate its ends by a rivet 17 or the like on the outer or free end of an arm 18, which may be of channel construction and which preferably flares toward its inner end, and is cut away to provide a pair of spaced ears 19 forming a fork within which an eye 20 is fitted. 21 indicates a pivot pin extending through the arms 19 of the fork and through the eye 20 for pivotally connecting the arm 18 to the eye. The eye is mounted upon the lower end of a rod 22 which in turn has a bearing stud 23 upon its upper end mounted to turn in a bracket plate 24. The bracket plate 24 is secured by screws 25 or the like upon the top member 12' of the window frame. A U-shaped spring 26 having helices in the opposite arms thereof is mounted upon the pivot pin 21 with its closed end preferably extending across and engaging with the outer side of the arm 18, and with its free ends engaging the rod 22 for yieldingly urging the arm 18 inwardly toward the pane of glass 14.

The eye 20 at the lower end of the rod 22 is provided with a laterally projecting stud shaft 27 extending at right angles to the eye 20, and on which is mounted a pair of connectors 28 extending in opposite directions from the shaft 27. The free ends of the connectors 28 are hollow and provided with screw threads to receive the inner ends of threaded eye bolts 29 whereby the latter may be adjusted in the connectors 28. 30 indicates operating members connected at their ends to the eyes of the eye bolts 29. The operating members 30 preferably comprise flexible members, such as wire cables, chains, ropes or the like. As shown in Figure 1 the operating members extend from either side of the cleaning devices in opposite directions whereby they may be operated in opposite directions to effect a swing of the cleaning devices relative to the window 14 in the manner to be later set forth. Where a plurality of cleaning devices are used, an operating member 30 is connected through the eye bolts 29 of the inner or adjacent connectors 28 so that the operating means may act therethrough to swing all of the devices together.

31 indicates as an entirety means connected with the free end of one operating member at one side of the window 14 for pulling thereon to swing the cleaning device or devices in one direction. 32 indicates as an entirety means connected with the free end of the operating member at the other side of the window for pulling thereon to swing the cleaning device or devices in the opposite direction, Of the operating means 31, 31a indicates a coiled spring having one end connected to a portion of the vehicle or the windshield frame in any desired manner, for example by an eye bolt 31b which may be mounted in a bracket 31c or in the frame of the window or in the corner post 11. The opposite end of the spring 31a is connected by a hook or other element to the free end of the adjacent operating member 30. The operating spring 31a is arranged normally to act through the members 30 to swing the cleaning device or devices in one direction, being placed under tension when the operating means 32 operate to swing the cleaning device or devices in the opposite direction. Aside from its function to swing the devices 15 in one direction, the spring 31a serves to maintain the devices at one extreme position of movement so long as the operating means 32 is not operated.

Of the operating means 32, 32a indicates a device arranged to operate intermittently upon the adjacent operating member 30 in opposition to the spring 31a to swing the cleaning device or devices 15 in the opposite direction. In the form of construction shown in Fig. 1, the device 32a comprises an electric motor 32b, the shaft of which operates through a suitable speed reduction mechanism (not shown) to rotate a shaft 32c. The shaft 32c carries a crank 32d to which the operating member 30 is connected. As will be understood, each time the crank 32d makes one revolution it will act on the operating member 30 and through it swing the cleaning device 15 in one direction. By regulating the speed of the motor 32b, the pulls on the operating member 30 may be effected rapidly or slowly as desired. The motor 32b and the elements driven thereby are arranged to position the crank 32d between the motor and the window so that the crank end may be in the plane of movement of the arms 22. The operating members are so adjusted as to their lengths, by means of the eye bolts 29 and connectors 28, that when the crank moves outwardly away from the adjacent cleaning device 15 it pulls the latter over into one extreme position of movement. As the crank 32d moves inwardly toward the adjacent device 15 the adjacent end of the operating member 30 is relaxed so that the spring 31a may pull on the operating members and draw the cleaning devices into their extreme opposite or normal position. The casing of the motor 32b is provided with a foot piece 32b' by means of which it may be secured to the frame—the adjacent corner post 11—of the vehicle as shown in Figure 1 or to the frame of the window as shown in Figs. 4 and 5.

In the form of construction shown in Figs. 3 and 6, the operating device 32a comprises a solenoid having a winding 33 and a core 34, to which the operating member 30 is connected, preferably by means of an eye bolt 34a. The solenoid may be of any desired construction. It is mounted in a suitable casing 35. The casing 35 is provided with a foot piece 35a adapting it for mounting on the vehicle or window frame in the same manner as that described in connection with the motor 32b. The circuit for the solenoid winding 33, whereby it is energized, is preferably closed and opened in any desired manner, by an automatically operating means indicated as an entirety at 36. Of these automatic means 36a indicates a thermostatic couple, mounted in the casing 35 and connected through a lead 36a' to one end of the winding 33. The couple 36 is preferably mounted in an inner casing 35'. 36b indicates a lead from the other end of the winding and connected with a contact 36c which closes the circuit through the couple 36a—see Fig. 6. The contact 36c consists of a screw or bolt, mounted in one wall of the casing 35', whereby it may be turned to effect adjustment of its inner end. When the winding 33 is energized the core 34 will move inwardly and effect swinging movement of the cleaning devices 15 in one direction against the tension of the spring 31a. When the thermostatic couple expands—see dotted lines in Fig. 6—the circuit will be opened, the effect of which is to de-energize the winding 33 and permit the spring 31a to swing the devices 15 in the opposite direction. By providing an adjustment for the thermostatic couple, the automatic switch control may be regulated to effect the desired periods of dwell between the strokes of the wiper without at the same time changing or affecting the velocity of the latter, when it is actuated. The switch for closing the circuit to the motor or solenoid is preferably mounted at a convenient point inside the vehicle.

I have shown the thermostatic couple as mounted within a casing which forms a part of the casing for the solenoid.

Figs. 4 and 5 show my cleaning mechanism mounted directly upon the window frame members and the latter pivoted or trunnioned at 37 on the vehicle frame, so that the same operative relation is maintained between the motor, the operating member 30 and the cleaning devices as that shown in Fig. 1. In this manner the window cleaning mechanism is mounted solely upon the movable part of the windshield, and the windshield and cleaning mechanism may then be adjusted as a unit.

From the foregoing description it will be seen that the mechanism may be adapted to various types of vehicle construction whether the windshield is slidable or pivotally mounted. To those skilled in the art to which my invention relates many alterations in construction and widely differing embodiments and applications of my invention will suggest themselves without departing from the spirit thereof. The disclosures herein and the description herein are merely illustrative and are not intended to be in any sense limiting.

What I claim is:—

1. In a window cleaning mechanism, a plurality of brackets mounted in spaced relation along the outer surface of the top of a window pane, a cleaning device pivotally mounted on each bracket and arranged to swing relative to the pane and in contact therewith, operating members disposed below said brackets and connected between and to the outer sides of said devices, a spring mounted at one vertical edge of the window pane and connected to one free end of one of said members for drawing said devices in one direction over the window pane, and a motor having an intermittently operable pulling device mounted at the other vertical edge of the window pane and connected to the free end of another operating member for drawing said devices in the opposite direction against the tension of said spring.

2. A cleaning mechanism for vehicle windshields comprising a bracket adapted to be attached to the frame of the windshield, a rod pivotally mounted in the bracket to swing in parallelism with the pane, a cleaning device pivotally mounted on said rod and arranged to swing at right angles to the movement thereof, a spring interposed between the rod and said cleaning device for normally urging the latter against the pane, pairs of adjustable elements pivotally connected to said rod and extending in opposite directions therefrom, operating members connected at their inner ends to said adjustable elements and extending in opposite directions, and separate means connected to the outer ends of said members for swinging the rod back and forth in opposite directions.

3. A cleaning mechanism for vehicle windshields comprising a bracket adapted to be attached to the frame of the windshield, a rod pivotally mounted in the bracket to swing in parallelism with the pane, a cleaning device pivotally mounted on said rod and arranged to swing at right angles to the movement thereof, a spring interposed between the rod and said cleaning device for normally urging the latter against the pane, pairs of adjustable elements pivotally connected to said rod and extending in opposite directions therefrom, operating members connected at their inner ends to said adjustable elements and extending in opposite directions, and separate means connected to the outer ends of said members for swinging the rod back and forth in opposite directions, one of said swinging means serving to control the operation of the other means.

4. A window cleaning mechanism comprising a cleaning device, means for pivotally supporting said device in operative relation to a window pane, means for normally urging said device to swing in one direction over said pane, an electric circuit, a solenoid in said circuit for swinging said device in the opposite direction, and electric means independent of said device for automatically opening and closing the circuit to said solenoid whereby it operates intermittently, said automatic means being connected in series in the circuit to said solenoid.

5. A window cleaning mechanism comprising a cleaning device, means for pivotally supporting said device in operative relation to a window pane, means for normally urging said device to swing in one direction over said pane, a solenoid for swinging said device in the opposite direction, and thermostatically controlled means for opening and closing the circuit to said solenoid.

6. A window cleaning mechanism comprising a cleaning device, means for pivotally supporting said device in operative relation to a window pane, means for normally urging said device to swing in one direction over said pane, a solenoid for swinging said device in the opposite direction, thermostatically controlled means for opening and closing the circuit to said solenoid, said thermostatically controlled means comprising a thermo-couple connected in series in the circuit to said solenoid.

7. In a windshield cleaner, a rotatably mounted spindle, a wiper carried thereby, a plunger slidably mounted and connected with said spindle to rock the latter, means for reciprocating said plunger, and a control device associated therewith and comprising an automatic timing device adapted to interrupt the reciprocations for definite time intervals, and means for adjusting said device to vary the periods of rest between said reciprocations.

8. In a windshield cleaner, a rotatably mounted spindle, a wiper carried thereby, an electric solenoid, a plunger slidable therein and connected with said spindle to rock the latter, an electric circuit through said solenoid, and a control device for said solenoid interposed in said circuit, said device comprising a timing switch, and means for adjusting said switch to vary the periods of rest between successive energizations of said solenoid.

9. In a windshield cleaner, a rotatably mounted spindle, a wiper carried thereby, an electric solenoid, a plunger slidable therein and connected with said spindle to rock the latter, an electric circuit through said solenoid, and a control device for said solenoid interposed in said circuit, said device comprising a thermostatically operated timing switch, and means for adjusting said switch to vary the periods of rest between successive energizations of said solenoid.

10. In a window cleaning mechanism, a cleaning device movably supported to move relative to a window pane, power means for moving said device, and thermostatically controlled means for setting said means in operation and stopping the same.

11. A mechanism as claimed in claim 10, in which means are provided for moving the cleaning device in one direction, separate means are provided for moving it in the opposite direction and the thermostatic controlled means actuates one of said moving means intermittently.

12. A mechanism as claimed in claim 10 in which said moving means is of the electric type and the thermostatically controlled means controls the circuit thereto.

In testimony whereof, I have hereunto subscribed by name.

FRITZ R. RYBERG.